May 17, 1932.  F. J. HINDERLITER  1,858,500
METHOD OF AND ROTARY SOCKET FOR FISHING OBJECTS FROM WELLS
Filed March 21, 1929  2 Sheets-Sheet 1
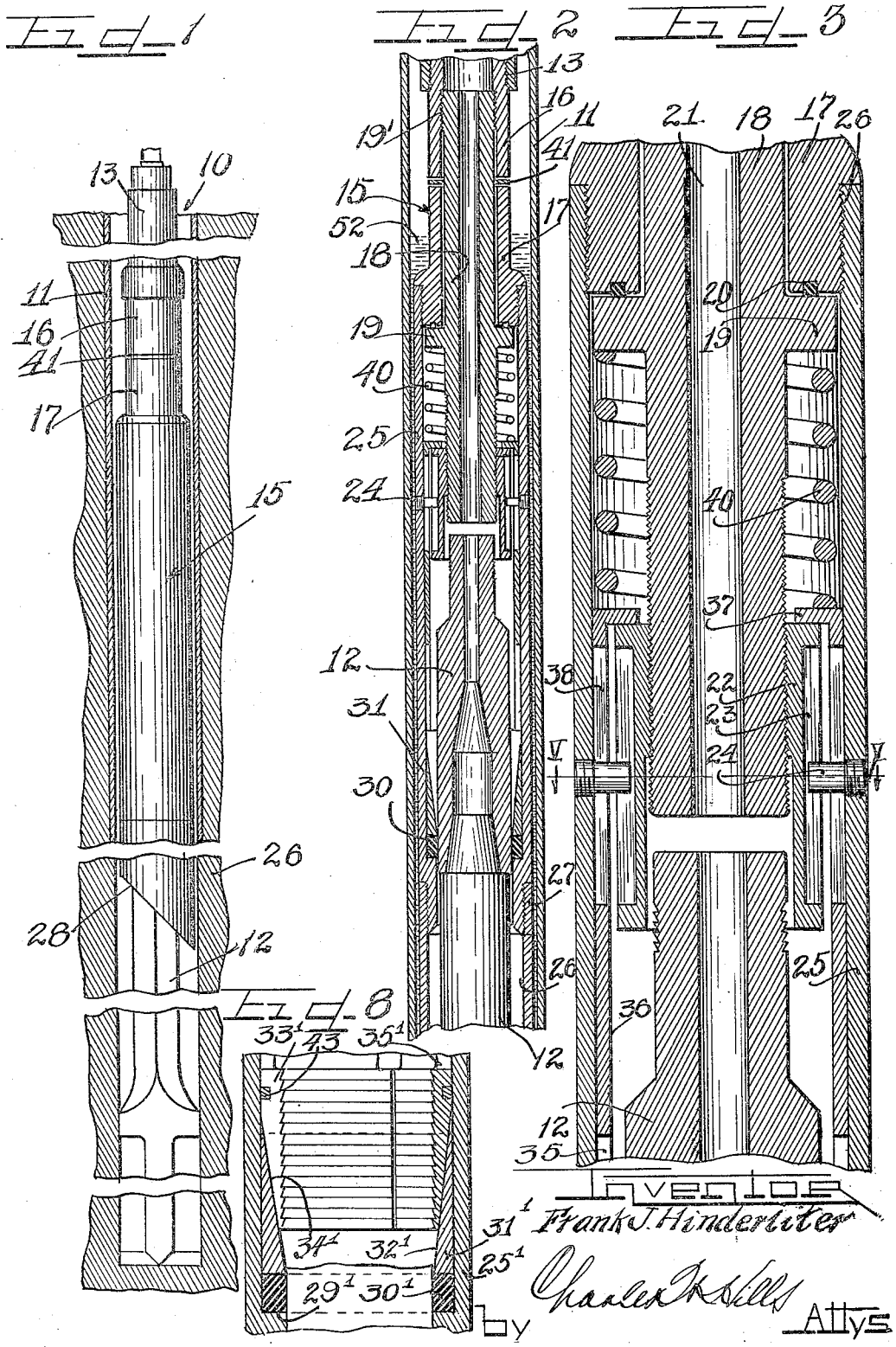

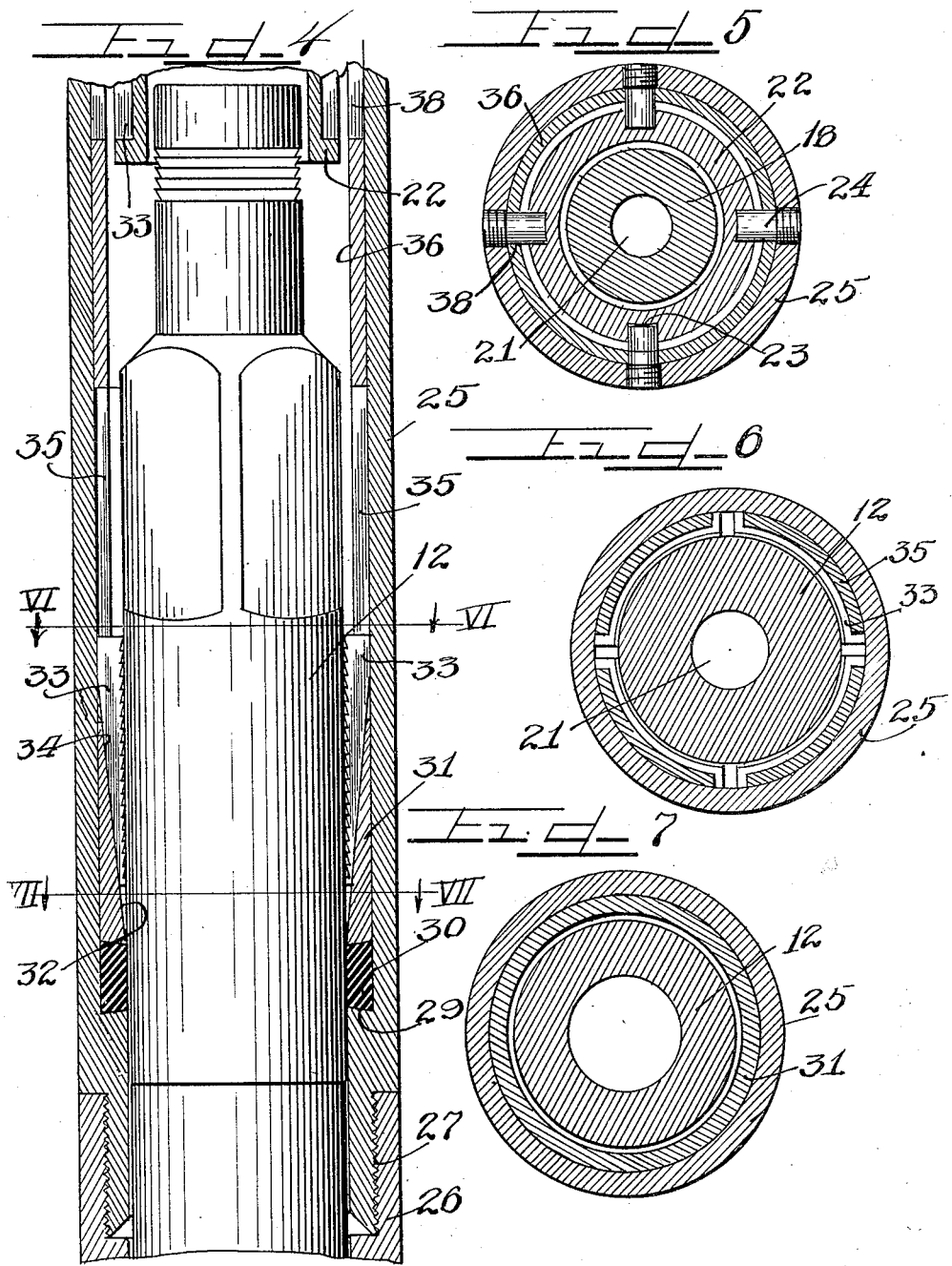

Patented May 17, 1932

1,858,500

UNITED STATES PATENT OFFICE

FRANK J. HINDERLITER, OF TULSA, OKLAHOMA

METHOD OF AND ROTARY SOCKET FOR FISHING OBJECTS FROM WELLS

Application filed March 21, 1929. Serial No. 348,695.

The present invention relates to a method of and a tool for fishing objects from a well and more particularly to a rotary releasable socket designed to fit over the pins of bits and the like stuck in the bottom of a well.

Heretofore considerable difficulty has been experienced in the retrieving of a lost bit in the bottom of a well especially when the bit is firmly imbedded or stuck in the slime and mud. As a result it has been necessary to employ fishing jars in connection with the fishing tool in order to jar loose the bit from the bottom of the well so it could be raised therefrom with the fishing tool.

I propose to provide a method of and a tool for fishing objects such as a bit from the bottom of a well which does not necessarily require the use of fishing jars but which is designed to utilize and harness the hydraulic pressure present in the well for the purpose of forcibly releasing the bit or other fish from the slime and mud in the bottom of the well thus resulting in a saving of time over the present or existing method as well as minimizing the wear and tear on the fishing tool.

An object, therefore, of the invention is to provide an improved method of and tool for fishing objects such as a bit or the like from a well.

Another object of the invention resides in the provision of a fishing tool for utilizing the hydraulic pressure present in the bottom of a well to aid the tool in the recovery of the fish from the well.

A further object of the invention is to provide a method of fishing an object from a well with a fishing tool which utilizes the hydraulic pressure present in the bottom of the well to forcibly free the object from the bottom of the well.

Still another object of the invention is to provide a fishing tool adapted to form a seal between it and the object being retrieved so that the fluid above the seal may be pumped from the well to enable the hydraulic pressure below the seal to become effective in forcibly freeing the object from the bottom of the well whereby the fishing tool may thereafter grip the object and raise it with facility out of the well.

A further object is to provide a fishing tool of the rotary socket type having releasable slips designed to be released from engagement with the fish by the hydraulic pressure present in the well.

In accordance with the general features of the invention, there is provided a fishing tool comprising a tubular or bowl member having therein downwardly and resiliently urged slips positioned on a compressible sealing ring and a central mandrel extending into the tubular member, the ring being compressed when the slips are forced into tight engagement with the object being recovered by an upward pull on the fishing tool whereby a seal is formed between the object and tool, and means for withdrawing the fluid in the tool from above this seal whereby the hydraulic pressure in the well will force the object upwardly against the lower end of the mandrel thus freeing it from the bottom of the well and enabling it to be removed from the well with the tool.

It is submitted that my novel method of fishing objects from a well will be fully understood from the following description of an apparatus by which the method may be practiced.

Figure 1 is a fragmentary sectional view of a well illustrating in elevation the use of my novel fishing apparatus in the recovery of an object from the bottom of the well.

Figure 2 is a fragmentary vertical sectional view through the fishing tool of my invention and a portion of the well casing and showing the object or fish in elevation.

Figure 3 is an enlarged vertical sectional view of a portion of my novel fishing tool illustrating in detail the support for the slips as well as the position of the central mandrel.

Figure 4 is an enlarged fragmentary sectional view showing the object in elevation and in engagement with the slips of my fishing tool.

Figure 5 is a cross sectional view taken on the line V—V of Figure 3 looking downwardly.

Figure 6 is a cross sectional view taken on the line VI—VI of Figure 4.

Figure 7 is a cross sectional view taken on the line VII—VII of Figure 4.

Figure 8 is a fragmentary sectional view of a modified form of wedge means for use with my fishing tool.

The reference character 10 designates generally a well (Figure 1) in which is sunk a well casing 11 of conventional construction. Disposed at the bottom of the well is a bit or other fish 12 which is to be recovered from the well by novel fishing tool. Extending down into the well casing 11 is a length of piping or tubing 13 to the lower end of which is screwed a fishing tool 15 embodying the features of my invention.

The fishing tool 15 comprises two tubes 16 and 17 (Figure 2) connected together through the means of a central mandrel 18, the upper end of the mandrel 18 is threaded at 19' into the tube 16, the lower end of this mandrel 18 as shown in Figure 3 is provided with an enlargement or annular flange 19 which is disposed adjacent the lower end of the tube 17. A ring-like rubber gasket 20 is disposed between the lower end of the tube 17 and the flange 19 on the mandrel 18. This rubber ring, as will more fully appear with the progress of the present description serves as a cushion for the mandrel 18 when it is engaged by the object being recovered in the well. Also it will be noted that the mandrel 18 is provided with a central bore 21.

The lower end of the mandrel 18 is threaded into a sleeve or bushing 22 having vertical slots 23 for accommodating the inner ends of pins 24 threaded into a bowl or tubular member 25. The upper end of the bowl 25 is threaded at 26 upon the lower end of the tube 17.

The lower end of the bowl or tubular member 25 is reduced and threaded upon a tubular guide 26 as indicated at 27. The tubular guide 26 has its lower end cut on a bevel or slant (Figure 1) as indicated at 28 in order to facilitate the alignment of the bit or object being fished for with the interior of the bowl 25. Also the lower end of the bowl 25 is provided on its interior with an annular shoulder 29 upon which is disposed a ring of rubber or other resilient substance 30. Positioned on this rubber ring 30 is a sleeve 31 having its internal surface beveled as indicated at 32.

The beveled surface 32 is adapted to accommodate and has disposed thereon a plurality of slips or wedges 33 each of which has a slanting surface 34 in contact with the surface 32 of the sleeve 31. Each of the wedges or slips 33 is connected by an arm 35 all of which arms are connected to a common sleeve 36. The upper end of this sleeve 36 as shown in Figure 3 is provided with an inwardly extending annular flange 37 which rests on the top of the sleeve or bushing 22. It will also be noted from Figure 3 that this sleeve 36 is provided with a plurality of vertical slots 38 corresponding in number and length to the slots 23 in the sleeve 22 and through which extend the pins 24. It is these pins 24, as will more fully appear hereinafter, which serve to limit the upper movement of the slip 33. A spring 40 surrounds the mandrel 18 and is positioned between the enlargement 19 of the mandrel and the flange 37 on the upper end of sleeve 36. This spring serves to at all times urge the slips in a downward direction so as to cause the flange 37 to engage the upper end of the sleeve 22.

From the illustration in Figure 2 it will also be observed that a steel gasket 41 is positioned between the adjacent ends of the tubes 16 and 17. This gasket serves to limit the amount of play between the tubes during the use of the fishing tool.

In Figure 8 I have illustrated an alternative form of wedge means comprising a plurality of sectional wedges 33' which are arranged in annular form and are held together by means of a resilient ring 43. These wedges 33' are connected to a common sleeve similar to the sleeve 36 of my preferred form of the invention by the means of the extensions or arms 35'. The lower end of the bowl 25' associated with this form of my invention is provided with a shoulder 29' upon which is disposed a rubber ring or gasket 30' having mounted thereon a sleeve 31' having its internal surface beveled as indicated at 32'.

The wedges 33' each have a slanting surface 34' in engagement with the beveled surface 32'. It will be evident from Figure 8 that a downward movement of the wedges will result in the compression of the gasket 30' in the same manner as the gasket 30 of the preferred form of my invention is compressed.

The operation and use of the fishing apparatus of my invention is briefly as follows.

The fishing tool 15 is lowered into the well casing 11 until the guide tube 26 of the same strikes the bit 12 in the bottom of the well and guides the bit into the interior of the bowl 25 of the tool. Thereafter an upward pull is exerted upon the piping 13 to cause the wedges or slips 33 to bite into the outer surface of the bit 12 (Figure 4) thus compressing the gasket or rubber ring 30 and establishing a seal between the ring and the object or fish.

Then the operator lowers a conventional bailer or sand pump into the piping 13 for the purpose of bailing and withdrawing the fluid from the interior of the piping and the tool above the seal established by the rubber ring 30.

Now, it will, of course, be evident that by removing the water from the piping and tool 15 the hydraulic pressure in the well, or, in other words, the weight of the column of water 52 in the well of casing 11 (Fig. 2) as well as in the bottom of the well will react upon the bit and force it upwardly as the pressure within the piping 13 is depleted. This will result in the bit 12 or other fish "shooting" or being forcibly moved upwardly within the bowl 25 until the upper end of the same strikes the lower end of the mandrel 18. This upward movement of the bit will, of course, move and loosen the wedges or slips 33 and compress the spring 40. In other words, the hydraulic pressure present within the well is actually utilized to free the bit or other fish from the slime or mud in the bottom of the well and in that way eliminates the necessity of jarring the bit as has been the practice heretofore.

The jar imposed upon the mandrel by the upward movement of the bit into contact therewith is cushioned by the rubber gasket 20. Also due to the space between the adjacent ends of the tubes 16 and 17 the mandrel in tube 16 is capable of a relatively slight amount of movement with respect to the tube 17. The steel gasket 41 in this space between the adjacent ends of the tubes 16 and 17 serves to minimize the wear and tear at this point in the fishing tool.

Attention is also directed to the fact that in the upward movement of the bit the slips 33 are permitted to move therewith due to the provision of slots 38 in the sleeve 36 connected to the slips which slots accommodate the pins 24. These pins will, of course, permit of a longitudinal movement of the slips but will serve to prevent rotation of the same. The spring 40 tends to resist the upward movement of the slips and in fact cushions the slips during this action of the tool.

Thereafter an upward pull is exerted upon the piping 13 thus causing the slips 33 to again bite into the outer surface of the freed bit 12 and thereby enabling the bit to be tightly wedged to the fishing tool 15. Then the tool and the bit 12 may be readily removed from the well casing in a manner well known to those familiar with this art.

It is submitted that the modified form of slip shown in Figure 8 operates in substantially the same way as the slips 33 and for that reason no further description of the same is thought necessary.

I claim as my invention:

1. The method of removing an object from a well with a given tool which consists in lowering the tool in the well to a position adjacent said object, forming a seal in said well at said position, removing liquid from above said position to enable the hydraulic pressure in the bottom of said well to force said object free from the bottom of the well, and then raising said object from the well.

2. The method of removing an object from a well with a fishing tool which consists in lowering the tool in the well to a position adjacent said object, engaging the object by the fishing tool to form a seal in said well at said position, removing liquid from above said position to enable the hydraulic pressure in the bottom of said well to force said object free from the bottom of the well and then raising said object from the well with said tool.

3. The method of removing an object from a well with a fishing tool which consists in lowering the tool in the well to a position adjacent said object, engaging the object by the fishing tool, exerting an upward pull on the tool in the well, utilizing said pull to form a seal at said position, removing liquid from above said position to enable the hydraulic pressure in the bottom of the well to force said object free from the bottom of the well and then raising said object from the well with said tool.

4. The method of removing an object from a well with a fishing tool which consists in engaging the object by the fishing tool, forming a seal between the tool and object, and removing the liquid in the tool above the seal to enable the hydraulic pressure below the seal to act on the object and force it upwardly into the tool thus freeing it from the bottom of the well.

5. The method of removing an object from a well with a fishing tool which consists in engaging the object by the fishing tool to form a seal between the tool and the object, and removing the liquid in the tool above the seal to enable the hydraulic pressure below the seal to act on the object and force it upwardly into the tool thus freeing it from the bottom of the well.

6. The method of removing an object from a well with a fishing tool which consists in engaging the object by the fishing tool, exerting an upward pull on the tool in the well, utilizing said pull to form a seal between the tool and object, and removing the liquid in the tool above the seal to enable the hydraulic pressure below the seal to act on the object and force it upwardly into the tool thus freeing it from the bottom of the well.

7. The method of removing an object from a well with a fishing tool which consists in lowering the tool in the well to a position adjacent said object, engaging the object by the fishing tool, exerting an upward pull on the tool in the well, utilizing said pull to form a seal at said position, removing liquid from above said position to enable the hydraulic pressure in the bottom of said well to force said object free from the bottom of the well, cushioning the upward movement of the object and then securing the object to said tool by an upward movement of the tool to enable the removal of said object from the well with said tool.

8. The method of removing an object from a well with a fishing tool which consists in lowering the tool in the well to a position adjacent said object, engaging the object by the fishing tool, exerting an upward pull on the tool in the well, utilizing said pull to form a seal at said position, removing liquid from above said position to enable the hydraulic pressure in the bottom of said well to force said object free from the bottom of the well, and then wedging the object to the tool so that it may be removed with the tool from the well.

9. The method of removing an object from a well with a fishing tool which consists in engaging the object by the fishing tool, forming a seal between the tool and object, removing the liquid in the tool above the seal to enable the hydraulic pressure below the seal to act on the object and force it upwardly into the tool thus freeing it from the bottom of the well and then raising the tool to secure the object thereto so that the object may be removed with the tool from the well.

10. The method of removing an object from a well with a fishing tool which consists in engaging the object by the fishing tool, forming a seal between the tool and object, removing the liquid in the tool above the seal to enable the hydraulic pressure below the seal to act on the object and force it upwardly into the tool thus freeing it from the bottom of the well and then wedging the object to the tool to permit of the removal of the object with the tool from the well.

11. In combination in a fishing tool of the class described, a body member, wedge means for engaging the object to be retrieved associated with said body member, including a member moveable longitudinally relative to said body member, means for at all times preventing relative rotation of said members and arranged to permit of relative longitudinal movement of said members, comprising means connected to one of said members and extending into an elongated aperture in the other of said members, the length of said aperture serving to limit the longitudinal movement of said movable member, and means for cushioning the movement of said movable member.

12. In combination in a fishing tool of the class described, a body member, wedge means for engaging the object to be retrieved associated with said body member, including a member movable longitudinally relative to said body member, means for preventing relative rotation of said members and arranged to permit of relative longitudinal movement of said members, comprising means connected to one of said members and extending into an elongated aperture in the other of said members, the length of said aperture serving to limit the longitudinal movement of said movable member, means for cushioning the movement of said movable member, cushioning means for resisting movement of said wedge means in one direction and means connected to said body member for limiting movement of said wedge means in another direction.

13. In combination in a fishing tool of the class described, a body member, wedge means for engaging the object to be retrieved associated with said body member, including a member movable longitudinally relative to said body member, means for preventing relative rotation of said members and arranged to permit of relative longitudinal movement of said members, comprising means connected to one of said members and extending into an elongated aperture in the other of said members, the length of said aperture serving to limit the longitudinal movement of said movable member, means for cushioning the movement of said movable member, cushioning means for resisting movement of said wedge means in one direction and means connected to said body member for limiting movement of said wedge means in another direction, said latter means comprising an element from which said wedge means is normally suspended and supported.

14. In combination in a fishing tool of the class described, a body member including a tubular portion, wedge means for engaging the object to be retrieved associated with said portion, including a member movable relative to said body member, said tubular portion and movable member comprising concentric sleeves disposed in telescoping relation, means associated with said members for preventing relative rotation therebetween and for limiting relative longitudinal movement between said members, and resilient means for resisting the movement of said wedge means in a given direction and for at all times urging said wedge means toward a predetermined position.

15. In combination in a fishing tool of the class described, a body member including a tubular portion, wedge means for engaging the object to be retrieved associated with said portion including a tubular member movable relative to said body member, an element connected to said body member and telescoping said tubular member arranged to serve as a stop to limit upward movement inside of the tubular portion of the object being recovered and means surrounding said element for cushioning said wedge means during movement of the latter and arranged to resist movement of said tubular member about said element.

16. In combination in a fishing tool of the class described, a body member including a tubular portion, wedge means for engaging the object to be retrieved associated with said portion including a tubular member movable relative to said body member, an element connected to said body member and extending into said tubular member arranged to serve as a stop to limit upward movement inside of the tubular portion of the object being recovered, means surrounding said element for cushioning said wedge means during movement of the latter and arranged to resist movement of said wedge means, and a resilient cushion between said element and said body member for cushioning said element when the element is engaged by the object to be retrieved.

17. In fishing apparatus of the class described, a fishing tool including means for engaging the object to be retrieved and for establishing a seal between the object and said tool and means for removing the fluid in the well above the seal formed by the said tool whereby the hydraulic pressure in the bottom of the well will become effective to force the object free from said bottom of the well.

18. In fishing apparatus of the class described, a fishing tool including means for engaging the object to be retrieved and for establishing a seal between the object and said tool and means for removing the fluid in the well above the seal formed by said tool whereby the hydraulic pressure in the bottom of the well will become effective to force the object free from said bottom of the well, said tool including means for limiting and cushioning the upward movement of said object by said hydraulic pressure.

19. In fishing apparatus of the class described, a fishing tool including means for engaging the object to be retrieved to establish a seal therebetween, means for lowering the tool into the well and for exerting an upward pull on said tool to cause said means to engage the object and establish said seal, means for removing fluid from above the seal in the fishing tool to enable the hydraulic pressure in the bottom of said well to force said object free from the bottom of the well whereby said tool can be utilized to raise the object out of the well.

20. In fishing apparatus of the class described, a fishing tool including means for engaging the object to be retrieved to establish a seal therebetween, means for lowering the tool into the well and for exerting an upward pull on said tool to cause said means to engage the object and establish said seal, means for removing fluid from above the seal in the fishing tool to enable the hydraulic pressure in the bottom of said well to force said object free from the bottom of the well whereby said tool can be utilized to raise the object out of the well, said tool including cushioning means for limiting the upward movement of the object in said fishing tool by said hydraulic pressure.

21. In combination in a fishing tool of the class described, a body member including a tubular portion, wedge means for engaging the object to be retrieved associated with said portion, including a member movable relative to said body member, said tubular portion and movable member comprising concentric sleeves disposed in telescoping relation, and means associated with said members for preventing relative rotation therebetween and for limiting relative longitudinal movement between said members, said tubular portion being provided with a shoulder, an expansible ring on said shoulder to establish a seal between said object and said tool when in use, and a removable beveled sleeve supported above said ring and engageable by said wedge means to compress said ring.

22. In combination in a fishing tool of the class described a body member including a pair of aligned tubes, an element connected to the upper of said tubes and extending through the other tube, said element having an enlargement at the lower end of said second tube, a packing between said lower end of said lower tube and said enlargement of said element, a tubular sleeve connected to said lower tube and surrounding said element and wedge means disposed in said sleeve below the lower end of said element for engaging the object to be retrieved.

23. In combination in a fishing tool of the class described a body member including a pair of aligned tubes, an element connected to the upper of said tubes and extending through the other tube, said element having an enlargement at the lower end of said second tube, a packing between said lower end of said lower tube and said enlargement of said element, a tubular sleeve connected to said lower tube and surrounding said element, wedge means disposed in said sleeve below the lower end of said element for engaging the object to be retrieved, and a gasket between the adjacent ends of said tubes.

24. In combination in a fishing tool of the class described a body member, wedge means associated with said body member for engaging the fish, and means for enabling the hydraulic pressure within the well to automatically release the fish from engagement with said wedge means.

In testimony whereof I have hereunto subscribed my name at Tulsa, Tulsa County, Oklahoma.

FRANK J. HINDERLITER.